(12) United States Patent
Li et al.

(10) Patent No.: US 8,984,060 B2
(45) Date of Patent: *Mar. 17, 2015

(54) REBUILD SYSTEM FOR A STORAGE NETWORK

(71) Applicant: International Business Machines Corporation, Armonk, NY (US)

(72) Inventors: Ping Li, Shanghai (CN); Min Cai, Shanghai (CN); Hui Yang, Shanghai (CN); Jia M. Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,032

(22) Filed: Oct. 29, 2013

(65) Prior Publication Data

US 2014/0089396 A1 Mar. 27, 2014

Related U.S. Application Data

(63) Continuation of application No. 13/625,646, filed on Sep. 24, 2012.

(51) Int. Cl.
*G06F 15/16* (2006.01)
*H04L 29/08* (2006.01)

(52) U.S. Cl.
CPC ......... *H04L 67/1097* (2013.01); *H04L 67/1095* (2013.01)
USPC ........... 709/203; 709/201; 709/202; 709/208; 709/209; 709/210; 709/211; 709/212; 709/213; 709/217; 709/218; 709/219; 709/220; 709/221; 709/222; 709/223; 709/224; 709/225; 709/226; 709/227; 709/228; 709/229

(58) Field of Classification Search
USPC ........ 709/201, 202, 203, 208, 209, 210, 211, 709/212, 213, 217, 218, 219, 220, 221, 222, 709/223, 224, 225, 226, 227, 228, 229
See application file for complete search history.

(56) References Cited

U.S. PATENT DOCUMENTS

| 7,694,169 B2 * | 4/2010 | Slater et al. ..................... 714/4.1 |
| 7,711,814 B1 * | 5/2010 | Emerick et al. ............... 709/224 |
| 7,730,218 B2 * | 6/2010 | Sullivan ......................... 709/250 |
| 8,145,748 B2 * | 3/2012 | Denis et al. .................... 709/224 |
| 2006/0129878 A1 * | 6/2006 | Soto et al. .......................... 714/7 |
| 2006/0265418 A1 * | 11/2006 | Dolezal et al. ................ 707/102 |
| 2007/0220304 A1 * | 9/2007 | Slater et al. ....................... 714/4 |
| 2008/0215727 A1 * | 9/2008 | Denis et al. .................... 709/224 |
| 2009/0037934 A1 * | 2/2009 | Sullivan ......................... 719/317 |

\* cited by examiner

Primary Examiner — Saket K Daftuar
(74) Attorney, Agent, or Firm — Griffiths & Seaton PLLC

(57) ABSTRACT

Rebuild systems and methods for a network are provided. One rebuild system includes a client device including an event handler and an indication listener associated with the event handler and a server device in communication with the client device. The server device includes an indication subscription associated with the event handler and a self-registration trigger (SRT) module in communication with the indication subscription for rebuilding the event handler and the indication listener. One rebuild method includes storing, by the indication subscription, rebuild data associated with the event handler and the indication listener and rebuilding, by the SRT module, the event handler and the indication listener with the rebuild data. Also provided are physical computer storage mediums including a computer program product rebuild method for a network. One computer program product rebuild method includes computer code for performing the above method.

7 Claims, 5 Drawing Sheets

REBUILD SYSTEM FOR A STORAGE NETWORK

CROSS REFERENCE TO RELATED APPLICATIONS

This application is a Continuation of U.S. patent application Ser. No. 13/625,646, filed on Sep. 24, 2012.

FIELD OF THE INVENTION

The present invention relates generally to networks, and more particularly to, rebuild systems and methods for a network.

DESCRIPTION OF THE RELATED ART

Client-server network configurations are well known in the computer arts and are widely used in system management software. One client requests information and such information is provided, or served-up, by its server. To real-time monitor the status of components and modules at the server side, a client application can register indication listeners and corresponding event handlers at the client side.

When specific events on the server side need to be monitored, indication listeners and handlers are typically created manually and registered as an indication subscription on the server side. If the connection between the client side and the server side is interrupted (e.g., the client application restarts), all the indication listeners and handlers on the client side are lost and need to be recreated again. Furthermore, the indication subscriptions on the server side also need to be re-registered.

One of the major challenges a client management application faces includes manually creating the indication listeners and handlers time and time again, and registering the corresponding indication subscriptions when the connection between the client side and the server sever is broken and later recovers. This situation is a challenge because the situation requires that each client application maintain implementations to perform this task and update the indication subscriptions on the server side, each of which consumes a significant amount of resources.

Another challenge is ensuring that the client application receives all the missing events that occurred during the subscription rebuild process. Although certain intelligent mechanisms to resolve this issue exist, the process of restoring all of the indication listeners and handlers requires time during which one or more missing events may be sent back to the client application while the corresponding indication listener is still under construction, which may cause the client application to never receive the missing event(s).

SUMMARY OF THE INVENTION

Various embodiments provide rebuild systems for networks. One rebuild system comprises a client device comprising an event handler and an indication listener associated with the event handler. The rebuild system further comprises a server device in communication with the client device, the server device comprising an indication subscription associated with the event handler and a self-registration trigger (SRT) module in communication with the indication subscription. In one embodiment, the SRT module is for rebuilding the event handler and the indication listener as desired.

Other embodiments provide rebuild methods for networks. One rebuild method comprises storing, in the server device, rebuild data associated with the event handler and the indication listener and rebuilding the event handler and the indication listener in the client device with the rebuild data in the server device.

Also provided are physical computer storage mediums (e.g., an electrical connection including one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing) comprising computer program product rebuild methods for a network. One physical computer storage medium comprises computer code for storing, in the server device, rebuild data associated with the event handler and the indication listener and computer code for rebuilding the event handler and the indication listener in the client device with the rebuild data in the server device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide rebuild systems and methods for networks. One rebuild system comprises a client device comprising an event handler and an indication listener associated with the event handler. The rebuild system further comprises a server device in communication with the client device, the server device comprising an indication subscription associated with the event handler and a self-registration trigger (SRT) module in communication with the indication subscription. In one embodiment, the SRT module is for rebuilding the event handler and the indication listener as desired.

A rebuild method comprises storing, in the server device, rebuild data associated with the event handler and the indication listener and rebuilding the event handler and the indication listener in the client device with the rebuild data in the server device.

Also provided are physical computer storage mediums (e.g., an electrical connection including one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing) comprising computer program product rebuild methods for a network. One physical computer storage medium comprises computer code for storing, in the server device, rebuild data associated with the event handler and the indication listener and computer code for rebuilding the event handler and the indication listener in the client device with the rebuild data in the server device.

Figure 1:
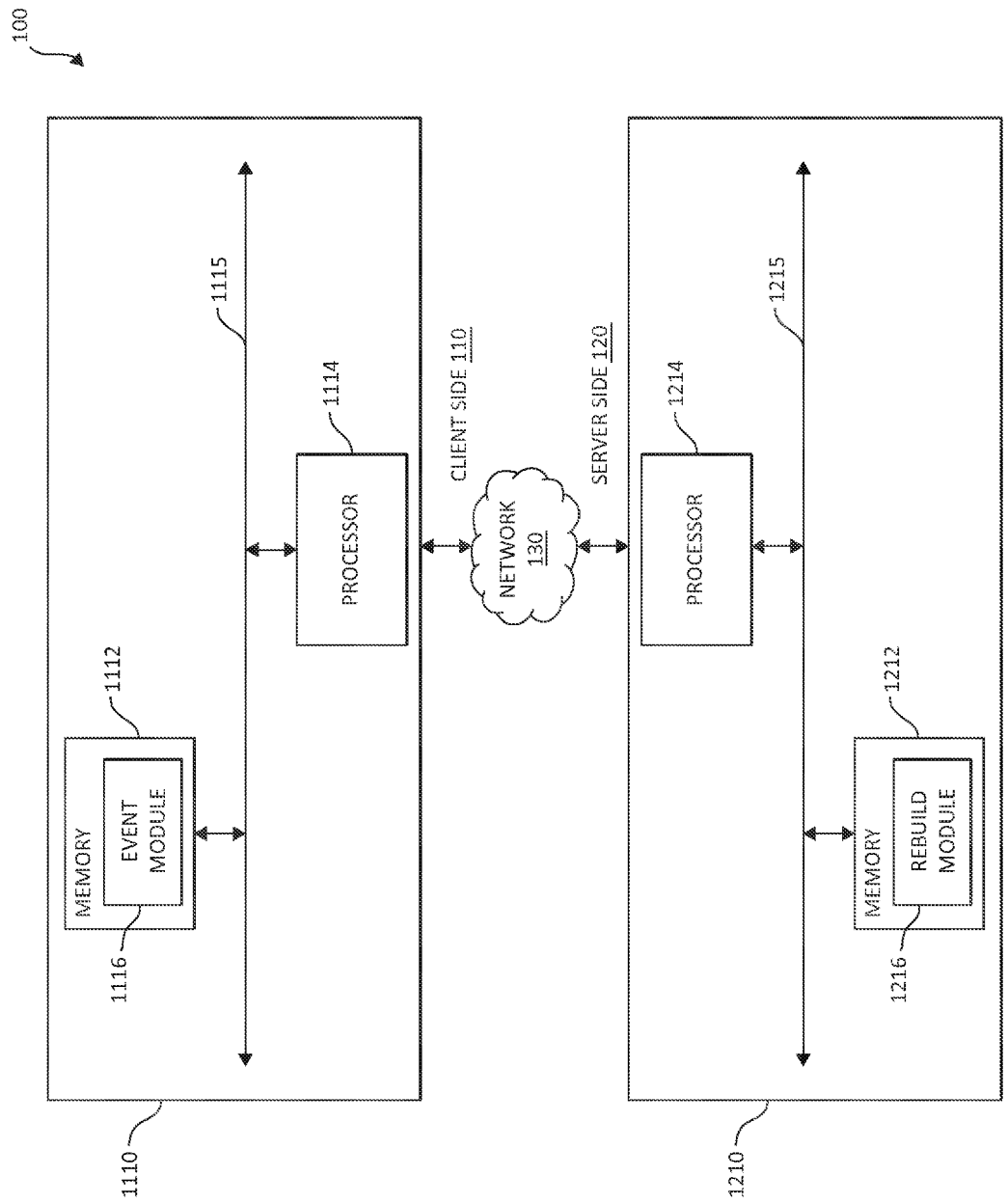
FIG. 1 is a block diagram of one embodiment of is a block diagram of one embodiment of a rebuild system for a network.

Turning now to the figures, FIG. 1 is a block diagram of one embodiment of a rebuild system 100 for a network. At least in the illustrated embodiment, rebuild system 100 comprises a client side 110 coupled to a server side 120 via a network 130 (e.g., a LAN, a WAN, a SAN, and/or the like networks).

Client side 110 comprises a client device 1110 comprising memory 1112 and a processor 1114 coupled to memory 1112 via a bus 1115 (e.g., a wired and/or wireless bus). Memory 1112 may be any type of memory known in the art or developed in the future capable of storing an event module 1116.

Figure 2:
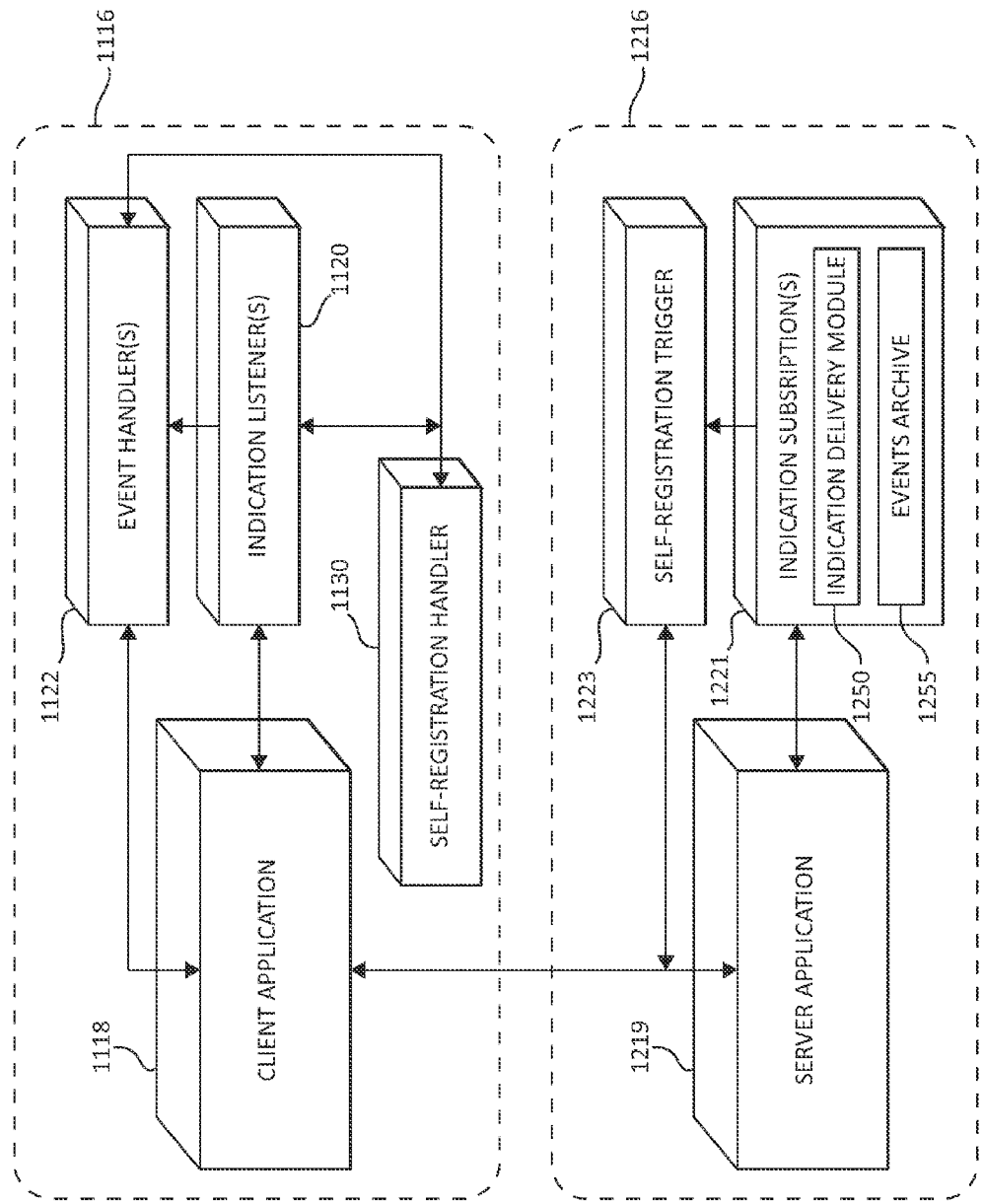
FIG. 2 is a block diagram of one embodiment of an event module and one embodiment of a rebuild module included within the rebuild system of FIG. 1.

Event module 1116 (see FIG. 2) comprises a client application 1118 in communication with one or more indication listeners 1120, one or more event handlers 1122 associated with the one or more indication listeners 1120, and a self-registration handler (SRH) module 1130. Client application 1118 may be any type of client application known in the art or developed in the future capable of communicating with server side 120 and rebuilding indication listener(s) 1120 and/or event handler(s) 1122 based on the rebuild data received from server side 120.

Indication listener(s) 1120 may be any type of indication listener known in the art or developed in the future. That is, indication listener(s) 1120 may be any type of program and/or code capable of directing event indications to the proper event handler(s) 1122.

Event handler(s) 1122 may be any type of event handler known in the art or developed in the future. That is, event handler(s) 1122 may be any type of program, subroutine, and/or code capable of handling events and/or inputs received from server side 120.

SRH module 1130 is in communication with/coupled to a Self-Registration Trigger (SRT) module 1223 on server side 120. In various embodiments, SRH module 1130 is configured to rebuild indication listener(s) 1120 and/or event handler(s) 1122 based on rebuild data received from SRT module 1223, as described below.

Returning to FIG. 1, processor 1114 may be any processing device capable of receiving the rebuild data from server side 120 and executing event module 1116. Specifically, processor 1114 receives rebuild data from server side 120 and executes the code and/or program(s) in event module 1116 to rebuild indication listener(s) 1120 and/or event handler(s) 1122 based on the rebuild data.

Server side 120, at least in the illustrated embodiment, includes a server device 1210 comprising memory 1212 and a processor 1214 coupled to memory 1212 via a bus 1215 (e.g., a wired and/or wireless bus). Memory 1212 may be any type of memory known in the art or developed in the future capable of storing a rebuild module 1216.

Rebuild module 1216 (see FIG. 2) comprises a server application 1219, one or more indication subscriptions 1221, and SRT module 1223 in communication with client application 1118 and with one another. Server application 1219 may be any server application known in the art or developed in the future capable of communicating with client application 1118 to transmit rebuild data to rebuild indication listener(s) 1120 and/or event handler(s) 1122.

Indication subscription(s) 1221 comprises may be any type of subscription capable of storing rebuild data for rebuilding indication listener(s) 1120 and/or event handler(s) 1122 and transmitting event indications to client side 110 (e.g., client device 1110). The rebuild data stored in indication subscription(s) 1221 is utilized by SRT module 1223 to rebuild indication listener(s) 1120 and/or event handler(s) 1122.

In addition to the rebuild data, indication subscription(s) 1221 comprise an indication delivery module 1250 and an events archive 1255. In one embodiment, indication delivery module 1250 is for transmitting events that occur while client device 1110 is offline to events archive 1255 for storage.

In various embodiments, SRT module 1223 comprises programs and/or code for detecting the online/offline status of client side 110 (e.g., client device 1110). In one embodiment, SRT module utilizes a heartbeat to determine the online/offline status of client device 1110.

SRT module 1223 is further configured to update the online/offline status of client device 1110 in indication subscription(s) 1221 when SRT module 1223 determines that that the status of client device 1110 has changed from online to offline. Furthermore, SRT module 1223 is configured to update the online/offline status of client device 1110 in indication subscription(s) 1221 when SRT module 1223 determines that that the status of client device 1110 has changed from offline to online.

When SRT module 1223 determines that the status of client device 1110 has gone from offline to online, SRT module 1223 is configured to retrieve the rebuild data stored in indication subscription 1221 (e.g., events archive 1255) and transmit the rebuild data to SRH module 1130 so that SRH module 1130 can rebuild indication listener(s) 1120 and/or event handler(s) 1122 utilizing the rebuild data.

Figure 3:
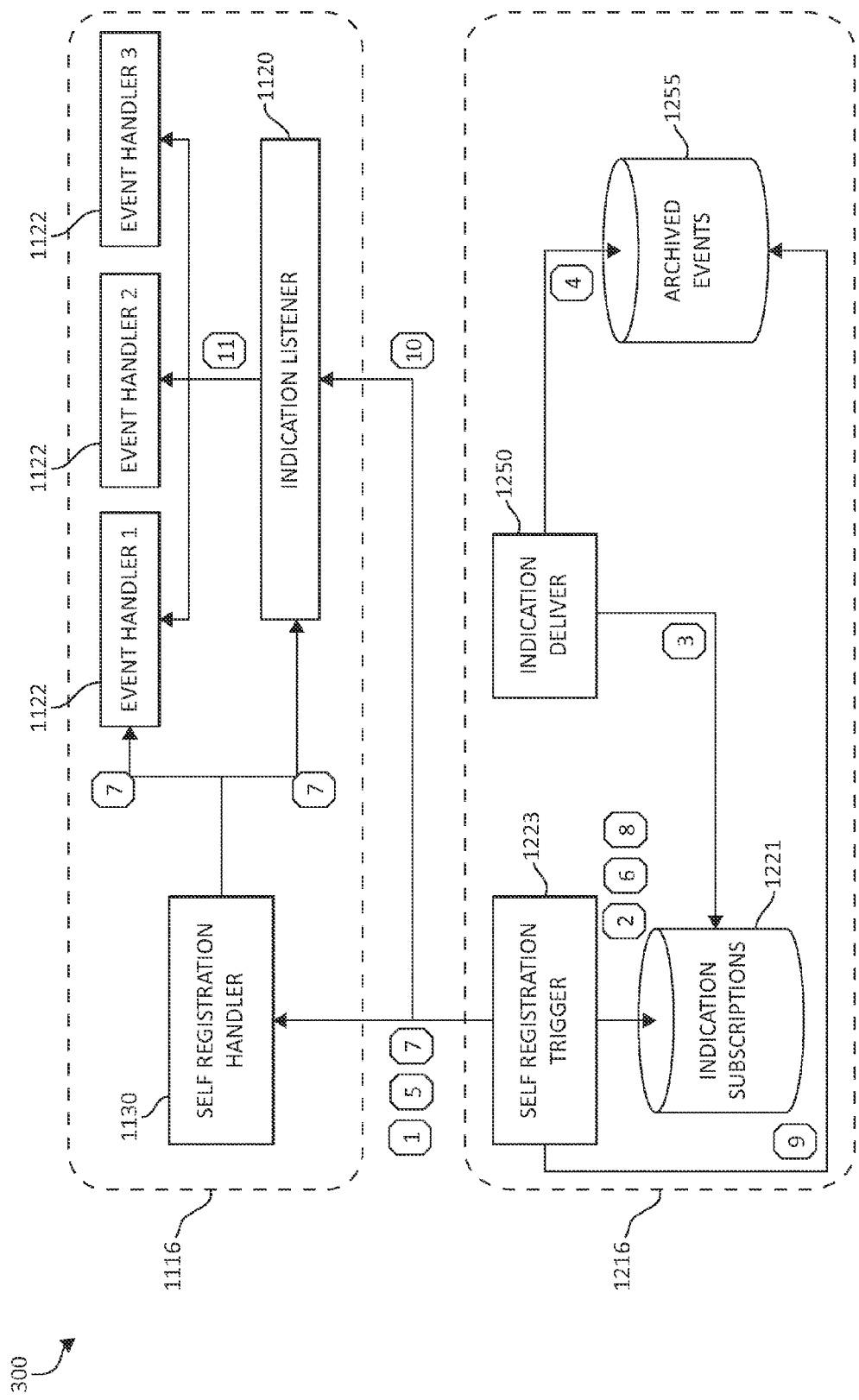
FIG. 3 is a flow diagram of one embodiment of the operation of the rebuild system of FIG. 1.

With reference now to FIG. 3, FIG. 3 is a flow diagram 300 of one embodiment of the operation of rebuild system 100. While flow diagram 300 is helpful in understanding the operation of rebuild system 100, the various embodiment of rebuild system 100 are not limited to the operation described in FIG. 3.

Flow diagram 300, at least in the illustrated embodiment, begin by SRT module 1223 transmitting heartbeats to SRH module 1130 and detecting that client device 1110 has gone from online to offline (stage 1). In response thereto, SRT module 1223 updates the status of client device 1110 as offline in indication subscription 1221 (stage 2).

When an event occurs that triggers indication delivery module 1250, indication delivery module 1250 retrieves the indication subscription data for this event together with the offline status of client device 1110 (stage 3). Since the status indicates that client device 1110 is offline, indication delivery module 1250 saves the event data to event archive 1255 (stage 4).

SRT module 1223 continues to heartbeat with SRH module 1130 at intervals and at some point detects that client device 1110 goes from offline to online (stage 5). SRT module 1223 then retrieves the indication subscription data from indication subscription 1221 (stage 6) and calls SRH module 1130 to re-establish indication listener(s) 1120 and/or event handler(s) 1122 with the transmitted indication subscription data (stage 7).

The status of client device 1110 is updated to online by SRT module 1223 in indication subscription 1221 (stage 8) and SRT module 1223 retrieves all of the events for client device 1110 that are archived in event archive 1255 (stage 9) SRT module 1223 then re-delivers the archived events to client application 1118 (stage 10) and client application 1118 rebuilds indication listener(s) 1120, which in response, direct the event(s) to the corresponding event handler(s) 1122 (stage 11).

Figure 4:
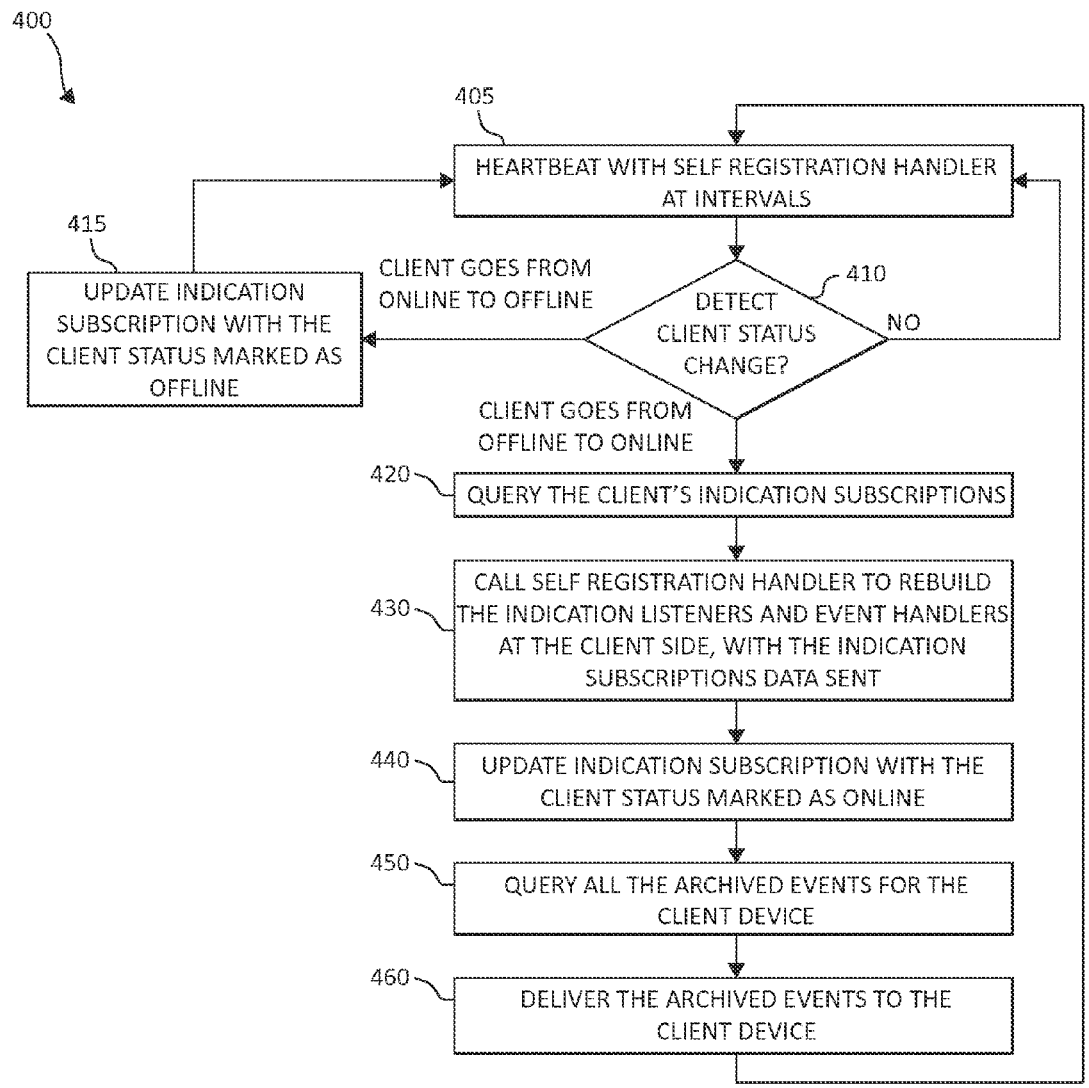
FIG. 4 is a flow diagram of one embodiment of a method for the workflow of a self-registration trigger module included within the rebuild module of FIG. 2.

With reference now to FIG. 4, FIG. 4 is a flow diagram of one embodiment of a method 400 for the workflow of SRT module 1223. While method 400 is helpful in understanding the operation of SRT module 1223, the various operations of SRT module 1223 are not limited to the operations described in FIG. 4.

Method 400, at least in the illustrated embodiment, begins by SRT module 1223 generating a heartbeat with SRH module 1130 at a predetermined interval (block 405). The heartbeat may be generated at any interval desired for the application of rebuild system 100.

While generating the heartbeat, SRT module 1223 determines if the status of client device 1110 has changed (block 410). If the status of client device 1110 remains the same (i.e., does not change), SRT module 1223 continues the heartbeat with SRH module 1130 (block 405).

If the status of client device 1110 changes from online to offline, SRT module 1223 updates the status of client device 1110 to offline in indication subscription(s) 1221 (block 415). If the status of client device 1110 changes from offline to online, SRT module 1223 queries the rebuild data stored in the indication subscription(s) 1221 associated with client device 1110 (block 420).

SRT module 1223 then calls SRH module 1130 to rebuild the indication listener(s) 1120 and/or event handler(s) 1122 in client device 1110 (block 430). SRT module 1223 also updates the status of client device 1110 as online in indication subscription(s) 1221 (block 440).

All of the events stored in events archive 1255 are queried (block 450) and the events are delivered/transmitted to client device 1110 (block 460). SRT module 1223 then continues to heartbeat with client device 1110 (block 405).

Figure 5:
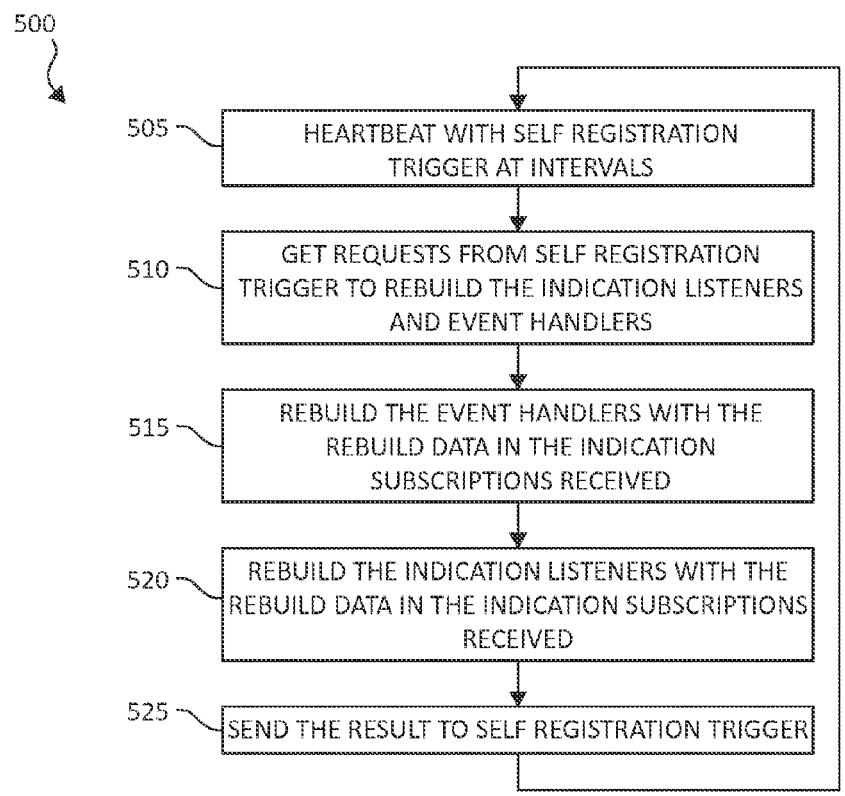
FIG. 5 is a flow diagram of one embodiment of a method for the workflow of a self-registration handler module included within the event module of FIG. 2.

Referring to FIG. 5, FIG. 5 is a flow diagram of one embodiment of a method 500 for the workflow of SRH module 1130. While method 500 is helpful in understanding the operation of SRH module 1130, the various operations of SRH module 1130 are not limited to the operations described in FIG. 5.

Method 500, at least in the illustrated embodiment, begins by SRH module 1130 receiving heartbeats from SRT module 1223 at a predetermined interval (block 505) and receiving requests and rebuild data from SRT module 1223 to rebuild the indication listener(s) 1120 and/or event handler(s) 1122 (block 510). SRH module 1130 rebuilds the event handler(s) 1122 (block 515) and/or the indication listener(s) 1120 (block 520) utilizing the rebuild data from SRT module 1223.

After the indication listener(s) 1120 and/or event handler(s) 1122 are rebuilt, SRH module 1130 transmits the result to SRT module 1223 (block 525). SRH module 1130 continues to receive heartbeats from SRT module 1123 and blocks 510 through 525 may be repeated as needed (block 505).

Figure 6:
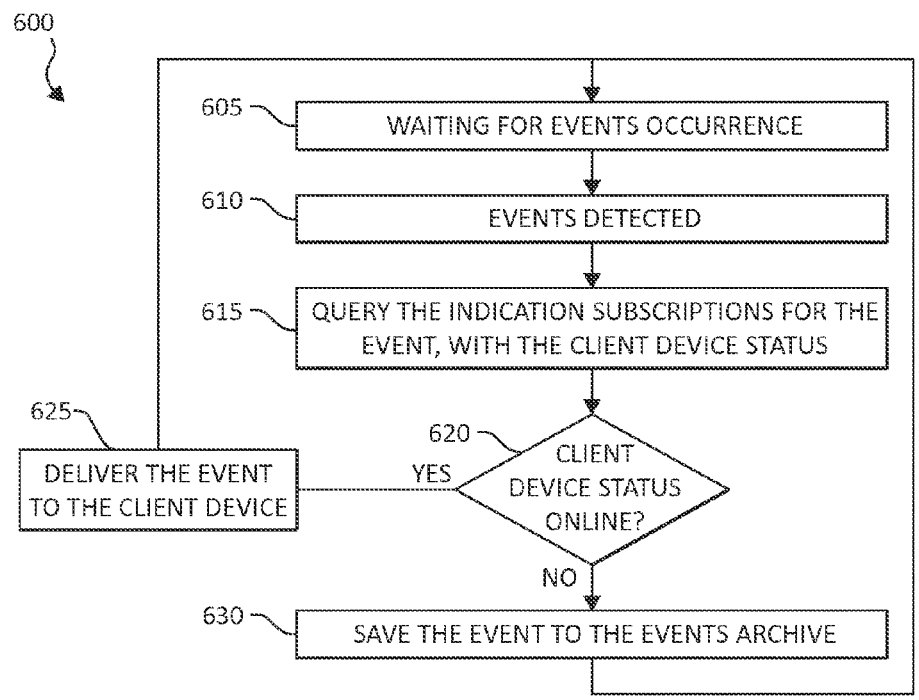
FIG. 6 is a flow diagram of one embodiment of a method for the workflow of a indication delivery module included within the rebuild module of FIG. 2.

With reference now to FIG. 6, FIG. 6 is a flow diagram of one embodiment of a method 600 for the operation of event delivery module 1250. At least in the illustrated embodiment, method 600 begins by waiting for an event to occur (block 605).

An event is eventually detected (block 610) and the indication subscription(s) are queried for the event data (block 615) and event delivery module 1250 receives the online/offline status of client device 1110 (block 620).

If client 1110 is online, the event is delivered/transmitted to client device 1110 (block 625) and event delivery module 1250 returns to waiting for the next event to occur (block 605). If client 1110 is offline, the event is saved to the events archive 1255 (block 630) and event delivery module 1250 returns to waiting for the next event to occur (block 605).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical processor, a magnetic processor, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A rebuild method for a network including a client device including a first memory comprising a self-registration handler (SRH) module, an event handler in communication with the SRH module, and an indication listener associated with the event handler and in communication with the SRH module, and a server device in communication with the client device, the server device including a second memory comprising an indication subscription associated with the event handler and a self-registration trigger (SRT) module in communication with the indication subscription, the method comprising:
    storing, by the indication subscription in the server, rebuild data via an event archive;
    retrieving, by the SRT module, the rebuild data;
    transmitting, by the SRT module, the rebuild data to the SRH module; and
    rebuilding, by the SRH module, the event handler and the indication listener with the rebuild data received from the SRT module.

2. The rebuild method of claim 1, further comprising:
    detecting, by a first heartbeat from the server device, that the client device is offline; and
    detecting, by the server device, an occurrence of an event while the client device is offline.

3. The rebuild method of claim 2, further comprising:
    detecting, by a second heartbeat from the server device, that the client device is online; and
    transmitting the event to the client device,
        wherein rebuilding the event handler and the indication listener with the rebuild data occurs prior to transmitting the event.

4. The rebuild method of claim 1, wherein storing the rebuild data occurs once and rebuilding the event handler and the indication listener occurs a plurality of times.

5. The rebuild method of 1, wherein the client device comprises a plurality of event handlers and a plurality of indication listeners and the server device comprises a plurality indication subscriptions, the rebuild method further comprising:
    storing, by the indication subscription in the server, rebuild data associated with each of the plurality of event handlers and each of the plurality of indication listeners;
    retrieving, by the SRT module, the rebuild data and transmitting the rebuild data to the SRH; and
    rebuilding, by the SRH module, the plurality of event handlers and the plurality of indication listeners utilizing the rebuild data.

6. The rebuild method of claim 5, further comprising:
    detecting, by a first heartbeat from the server device, that the client device is offline;
    detecting, by the server device, an occurrence of an event while the client device is offline;
    detecting, by a second heartbeat from the server device, that the client device is online; and
    transmitting the event to the client device, wherein rebuilding the plurality of event handlers and the plurality of indication listeners with the rebuild data occurs prior to transmitting the event.

7. The rebuild method of claim 5, wherein storing the rebuild data occurs once and rebuilding the plurality of event handlers and the plurality of indication listeners occurs a plurality of times.

* * * * *